Figure 1:
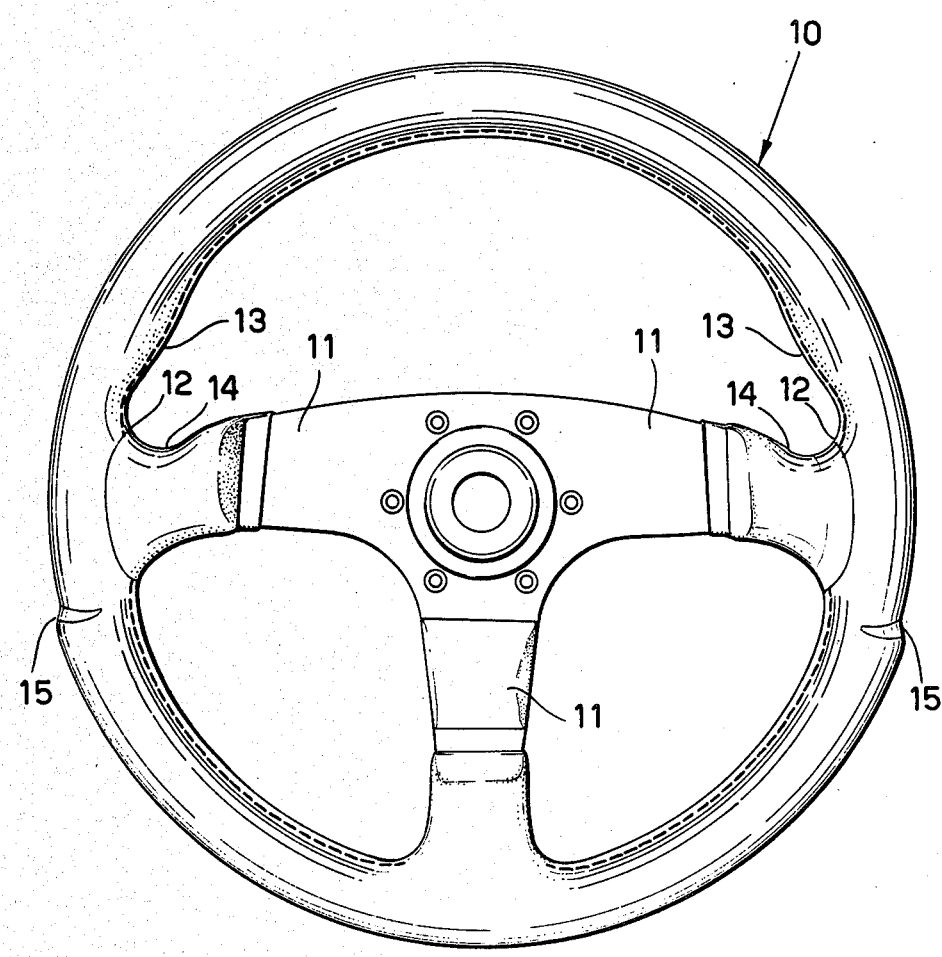

United States Patent [19]

Conterno

[11] 4,161,892
[45] Jul. 24, 1979

[54] STEERING-WHEEL RIM

[75] Inventor: Giovanni Conterno, Vedano Olona, Italy

[73] Assignee: Personal S.p.A., Abbiate Guazzone, Italy

[21] Appl. No.: 811,177

[22] Filed: Jun. 29, 1977

[30] Foreign Application Priority Data

Oct. 29, 1976 [IT] Italy ............................ 22423 B/76

[51] Int. Cl.² .......................... B62D 1/04; G05G 1/10
[52] U.S. Cl. .................................... 74/552; D12/176
[58] Field of Search .................. 74/552, 554–558.5; 150/52 M; D12/176

[56] References Cited

U.S. PATENT DOCUMENTS

| D. 157,440 | 12/1950 | Schindler | 74/552 |
|---|---|---|---|
| 1,099,528 | 6/1914 | Wine | 74/552 |
| 1,317,730 | 10/1919 | Ryan | 150/52 M |
| 1,366,554 | 1/1921 | Blackburn | 74/552 |
| 1,646,410 | 10/1927 | La Pierre | 74/552 |
| 1,719,026 | 7/1929 | Scott et al. | 74/552 |
| 2,311,269 | 2/1943 | Van Cleave | 74/552 |
| 2,552,083 | 5/1951 | Bartsch | 74/552 |
| 2,881,638 | 4/1959 | Taylor | 74/552 |

FOREIGN PATENT DOCUMENTS

| 1107531 | 5/1961 | Fed. Rep. of Germany | 74/552 |
|---|---|---|---|
| 642191 | 8/1928 | France | 74/552 |
| 23175 | of 1915 | United Kingdom | 74/552 |
| 767258 | 1/1957 | United Kingdom | 74/552 |

OTHER PUBLICATIONS

Product Engineering, p. 644, Dec. 1941, "Dials and Handwheels Redesigned".

Primary Examiner—Leslie Braun
Attorney, Agent, or Firm—Charles E. Brown

[57] ABSTRACT

An anatomically shaped steering-wheel for motorcars and motor boats is disclosed, in which, in the steering-wheel areas adjacent to the spoke roots a hollow space is provided on the spoke root area, which is followed by a swelling of the inner surface of the rim, whereas an indentation is formed on the outer rim periphery to stop the slippage of the hand by providing an abutment or the hand's edge and the small finger. A safe and reliable grip of the steering-wheel is thus provided under any driving positions, such as sharp road bends, mountain driving and the like.

5 Claims, 2 Drawing Figures

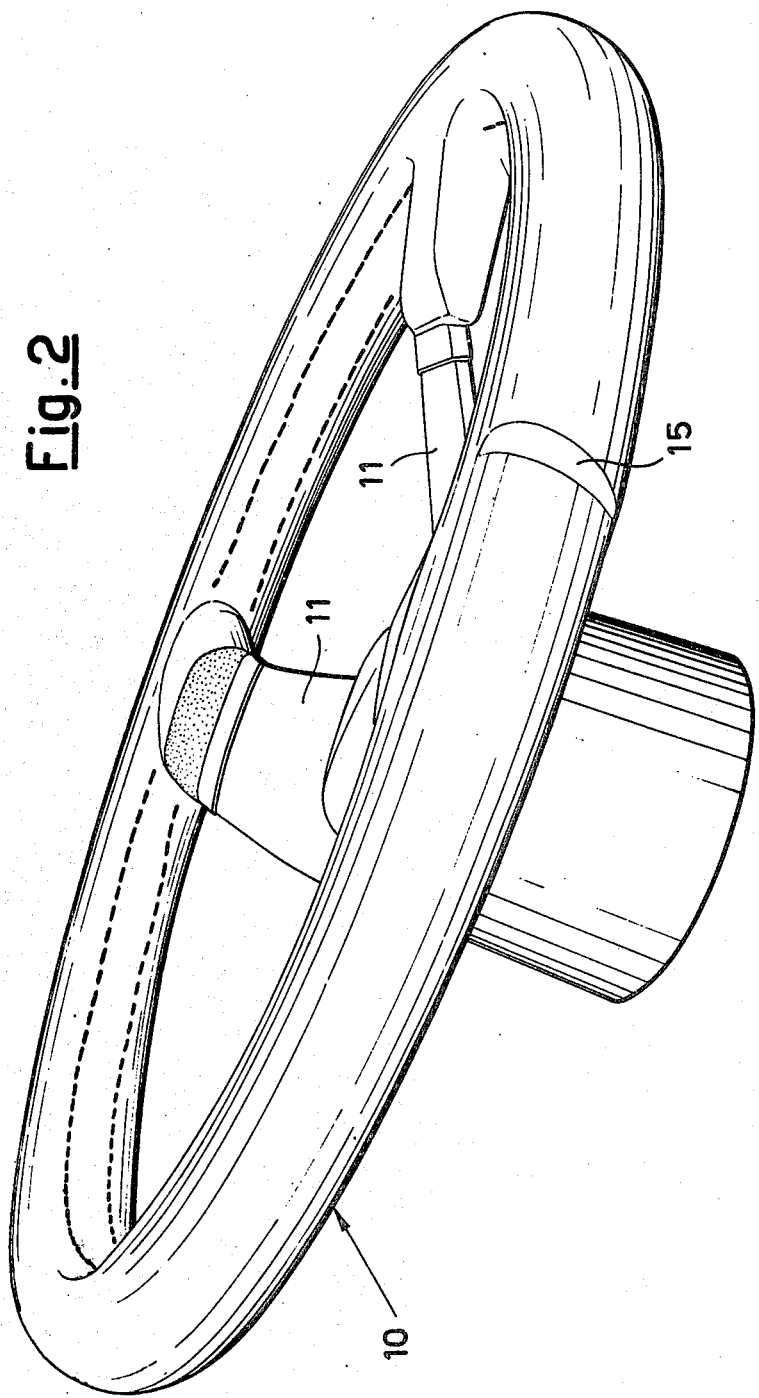

STEERING-WHEEL RIM

This invention relates to a steering-wheel for motor cars and watercraft, and more particularly the rim to be adopted for such steering-wheels.

It is well known that in the field of steering-wheels the constructors have adopted the most varied construction systems by acting on the number and the position of the spokes, by modifying the structure of the rim and/or its thickness, in order to fulfil the grasping and/-driving requirements under the most variable conditions.

In any case, however, the idea of an annulus having a constant cross-section along its entire circumferential length has been kept unaltered.

In the conventional steering-wheels of the kind referred to above, there are still a few problems and drawbacks outstanding, for which no satisfactory approaches have been found heretofore, such as, mainly, that of a correct grasp of the steering-wheel, especially when driving is required for a consistent number of consecutive hours.

Among the other problems and shortcomings that can be cited, there are, for example, that of the slipperiness of the rim under particular conditions and thus the unreliable grip exerted on the steering-wheel, and also the problem of the brisk recoil of the steering-wheel after a road bend, such a return being such as not to be carefully controlled by the driver.

It has now been found that such problems and shortcomings can substantially be done away with by a steering-wheel comprising a rim and one or more spokes for uniting the rim to the steering-wheel hub, which is characterized in that the rim, in correspondence with the positions of normal grasp on the rim, that is in positions which are substantially diametrically opposite to one another, has hollows and projections which are so shaped as to match the shape of a human hand under the steering-wheel grasping conditions.

In the preferred embodiment of the steering wheel according to the present invention, such hollows and projections substantially comprises a hollow space provided between the respective spoke and a rim swelling in which the thumb can be housed and a projection of the outer peripheral surface of the rim on which the so-called hand-edge and a portion of the small finger are stably resting.

Aspects and advantages of the present invention will become more clearly apparent from the ensuing detailed description which is given by way of example only, with reference to the accompanying drawings, in which:

FIG. 1 shows the steering wheel according to the present invention in plan view, and FIG. 2 is a perspective view of the steering-wheel shown in FIG. 1.

With reference to the drawings, the steering-wheel according to this invention comprises a rim, 10 and three spokes, 11.

In correspondence with the normal grasping positions of the rim 10, the rim has a hollow 12, intended to receive the thumb, and obtained by means of a projection 13, formed on the rim, and a hollowed-out portion, 14, of the attendant spoke 11. It is apparent, however, that the hollow space 12 could likewise be formed entirely in the rim 10, quite apart from the exploitation, which is preferred as itself, of the spoke 11.

On the outer peripheral surface of the rim 10, moreover, a transversal projection, 15, which appropriately radiussed and smoothly connected to the remainder of the rim and is intended to give a rest from the hand-edge in correspondence with the small-finger root.

It will be clear, therefore, that with the steering-wheel according to this invention, the grasp takes place under correct conditions and efficiently without having the rim slipping relative to the hand palm. In addition, the engagement between the hand-edge and the projection 15 makes more convenient the check of the recoil motion of the steering-wheel after having negotiated a bend and thus the control of the resumption of the run of the wheels or the watercraft is facilitated.

The invention has been described in connection with a preferred embodiment thereof, being it understood that small changes which are ideally and structurally equivalent can be introduced therein without departing from the scope of the invention.

For example, the steering-wheel shown in the drawings has a cushioned rim, but exactly the same results are obtained in the case of application of the invention to conventional wooden or plastics material steering-wheels.

I claim:

1. A steering-wheel comprising a rim, a central hub, at least two diametrically opposite spokes connecting said rim to said central hub and dividing said rim into upper and lower portions, and hand resting means arranged at the junctions of said two spokes with said rim, said hand resting means comprising a pair of thumb seats each associated with one of said spokes and formed by a projection on the inner side of the upper portion of the rim adjacent the intersection of the respective spoke with said rim and by an adjacent hollow space in the inner side of said upper portion of the rim adjacent the intersection of the respective spoke with said rim and being positioned below said projection and continuing into the upper side of respective spoke, and a pair of rear hand-edge seats each associated with one of said spokes and formed by an upwardly facing shoulder in the outer side of the lower portion of the rim.

2. A steering-wheel in accordance with claim 1, wherein with the exception of the portions between respective projection and hand-edge seats, said rim is of a constant cross section.

3. A steering-wheel in accordance with claim 2, wherein each hand-edge seat is formed by a radially inwardly reduction of the width of said rim at the outer side thereof in the area of a respective spoke.

4. A steering-wheel in accordance with claim 1, wherein each hand-edge seat is formed by a radially inwardly reduction of the width of said rim at the outer side thereof in the area of a respective spoke.

5. A steering-wheel in accordance with claim 4, wherein said shoulder is abrupt and radially blends into said rim.

* * * * *